United States Patent [19]

Lawler

[11] Patent Number: 5,428,763
[45] Date of Patent: Jun. 27, 1995

[54] DIGITAL DATA APPARATUS FOR TRANSFERRING DATA BETWEEN A BYTE-WIDE DIGITAL DATA BUS AND A FOUR BYTE-WIDE DIGITAL DATA BUS

[75] Inventor: Edward P. Lawler, Fairport, N.Y.

[73] Assignee: Eastman Kodak Company, Rochester, N.Y.

[21] Appl. No.: 237,425

[22] Filed: May 3, 1994

Related U.S. Application Data

[63] Continuation of Ser. No. 783,487, Oct. 28, 1991, abandoned.

[51] Int. Cl.[6] .......................... G06F 7/00; G06F 13/00
[52] U.S. Cl. ...................... 395/500; 395/800; 395/250; 395/275; 364/927.92; 364/927.93; 364/926.3; 364/939.2; 364/939.3; 364/DIG. 1
[58] Field of Search ............... 395/800, 500, 250, 275; 364/DIG. 1, 927.92, 927.93, 926.3, 939.2

[56] References Cited

U.S. PATENT DOCUMENTS

| | | | |
|---|---|---|---|
| 4,527,237 | 7/1985 | Frieder et al. | 395/200 |
| 4,688,166 | 8/1987 | Schneider | 395/275 |
| 4,716,525 | 12/1987 | Gilanyi et al. | 395/250 |
| 4,716,527 | 12/1987 | Graciotti | 395/250 |
| 4,783,705 | 11/1988 | Moon et al. | 360/77.08 |
| 4,805,097 | 2/1989 | DeSanna | 395/400 |
| 4,843,544 | 6/1989 | DuLac et al. | 395/250 |
| 4,847,759 | 7/1989 | Oklobdzija | 395/425 |
| 4,864,291 | 9/1989 | Korpi | 340/825.5 |
| 4,878,166 | 10/1989 | Johnson et al. | 395/425 |
| 5,109,490 | 4/1992 | Arimilli et al. | 395/375 |
| 5,163,131 | 11/1992 | Row et al. | 395/200 |
| 5,226,010 | 7/1993 | Glider et al. | 365/189.04 |
| 5,265,237 | 11/1993 | Tobias et al. | 395/500 |

FOREIGN PATENT DOCUMENTS 0290172 11/1988 European Pat. Off. .

OTHER PUBLICATIONS

WESCON/89 14 Nov. 1989, San Francisco, Calif., pp. 131–136, J. L. Lin, "Bidirectional FIFO in the Processor-to-Peripheral Communications".

Electronic Design, vol. 35, No. 25, 29 Oct. 1987, Hasbrouck Heights, N.J., pp. 87–90, N. K. Loulou, "SBX Adapter Equips SCSI Bus for Industrial Control Tasks".

Primary Examiner—Alyssa H. Bowler
Assistant Examiner—Dzung C. Nguyen
Attorney, Agent, or Firm—William F. Noval

[57] ABSTRACT

A digital data system includes a circuit for controlling data transfer between a four byte wide pathway, such as a VME bus, and a byte wide device, such as a SCSI disk drive by way of a byte wide bus (SCSI bus). The control circuit effects selective data transfer of an odd or even data byte, a data short word (two parallel bytes) or a data long word (four parallel bytes). The transfer circuit includes a four byte wide data register connected to the VME bus, four, byte wide, funnel registers connected in parallel to the data register, a byte wide FIFO memory connected between the funnel registers and the SCSI disk drive via a SCSI bus. A DMA controller and funnel controller state machine control transfer of data from the VME bus to the SCSI disk drive either as a data byte, a data short word or a data long word.

3 Claims, 1 Drawing Sheet

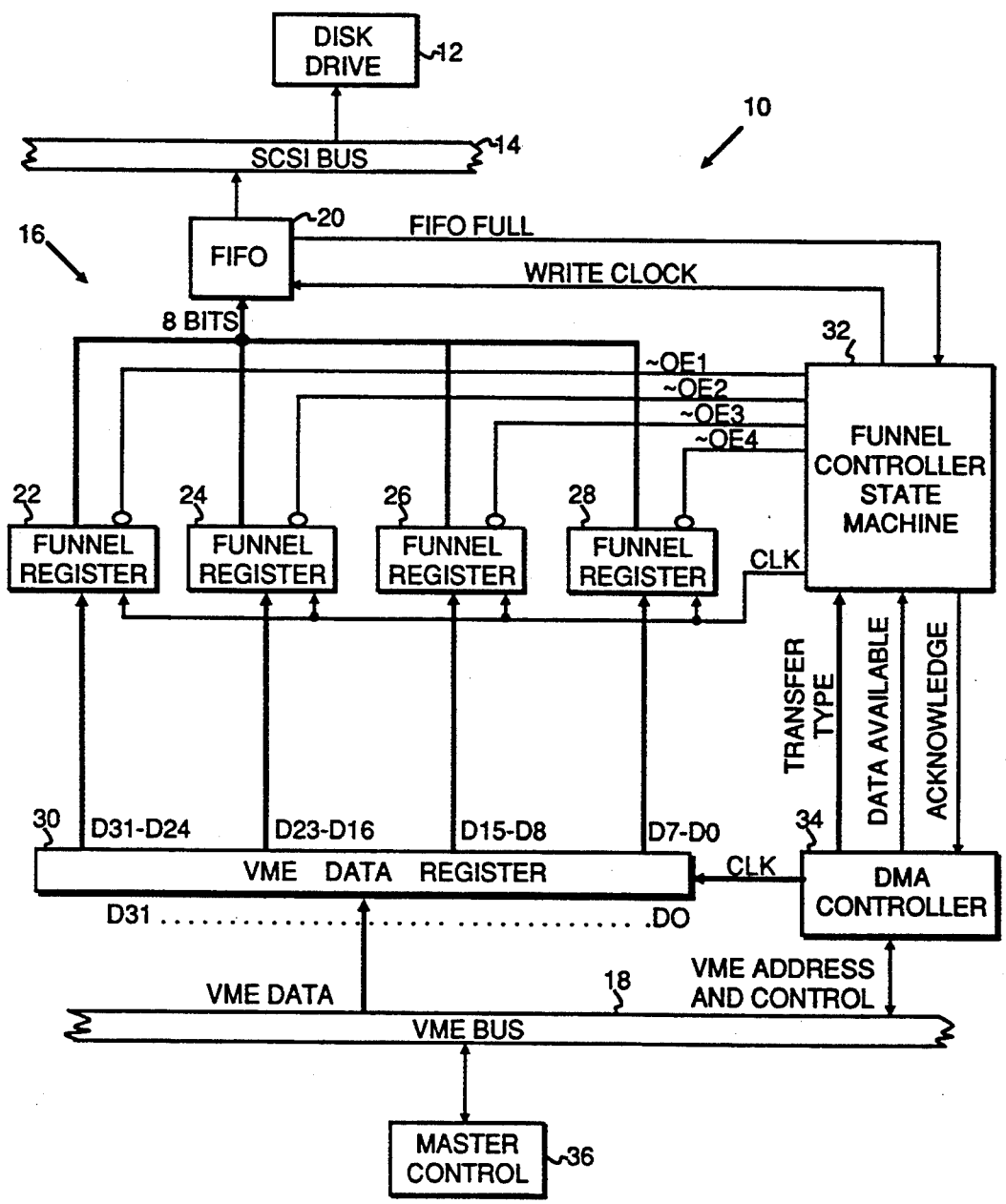

DIGITAL DATA APPARATUS FOR TRANSFERRING DATA BETWEEN A BYTE-WIDE DIGITAL DATA BUS AND A FOUR BYTE-WIDE DIGITAL DATA BUS

This is a Continuation of application Ser. No. U.S. 783,487, filed 28 Oct. 1991, now abandoned.

BACKGROUND OF THE INVENTION

This invention relates in general to digital data systems and more particularly to the control of data transfer from a VME bus to a SCSI disk drive.

A need exists to transfer data between a SCSI (Small Computer Systems Interface) device, such as a disk drive, and a VME bus. This requires adapting the SCSI channel, which is a byte-wide data pathway, to the VME bus, which can be either a byte, short word (2 parallel bytes), or long word (4 parallel bytes) pathway. VME bus byte transfers can occur over two sets of data lines, i.e. D0 through D7 or D8 through D15. Short word transfers use data lines D0 through D15. Long word transfers use data lines D0 through D31. Accordingly, the circuit must accommodate each of these pathways, while maintaining the data in the proper sequence regardless of the width of transfer, or of interleaving of the data widths.

The following patents describe several configurations for effecting data transfer which do not satisfy this need due to undue complexity, excessive cost and/or unreliability.

U.S. Pat. No. 4,843,544, issued Jun. 17, 1989, Inventors DuLac et al;

U.S. Pat. No. 4,847,759, issued Jul. 11, 1989, Inventor Oklobdzija.

U.S. Pat. No. 4,805,097, issued Feb. 14, 1989, Inventor DeSanna;

U.S. Pat. No. 4,864,291, issued Sep. 5, 1989, Inventor Korpi;

U.S. Pat. No. 4,783,705, issued Nov. 8, 1988, Inventors Moon et al.;

U.S. Pat. No. 4,716,525, issued Dec. 29, 1987, Inventors Galanyi et al.

SUMMARY OF THE INVENTION

According to the present invention, there is provided an apparatus for controlling data transfer from a four byte wide pathway, such as a VME bus, to a byte wide device such as a SCSI disk drive. The data transfer is effected in a simple efficient manner for either a data byte, a data short word (2 parallel bytes) or a data long word (4 parallel bytes).

According to an aspect of the present invention, data transfer circuit includes a first digital data bus for transferring data up to a byte wide, a second digital data bus for transferring data up to four bytes wide, a data register connected to the second bus for storing four data bytes in parallel, a FIFO memory connected to the first bus for storing sequential data bytes, first, second, third and fourth funnel registers connected in parallel between the FIFO memory and the data register for storing data bytes and control means for selectively controlling the data register, funnel registers and FIFO memory to transfer data from the second bus to the first bus, either as a data byte, a data short word, or a data long word such that the order of data transferred to the second bus is most significant byte to least significant byte for each such data transfer.

DESCRIPTION OF THE PREFERRED EMBODIMENTS

Referring now to the Figure, there will be described a digital data system including an embodiment of the present invention. As shown, digital data system 10 includes a byte wide device such as SCSI disk drive 12 which is compatible with the Small Computer System Interface (SCSI) format. Data is transferred to drive 12 as an 8 bit data byte over a SCSI bus 14. A funnel circuit 16 transfers data from VME bus 18 (which is a four byte or 32 bits wide pathway) to SCSI bus 14.

Funnel circuit 16 includes first-in-first-out (FIFO) memory 20 (which stores data bytes in sequence), funnel registers 22, 24, 26, 28, (each of which stores a data byte) VME data register 30 (having outputs D31-D24, D23-D16, D15-D8, D7-D0), funnel controller state machine 32 and DMA controller 34. A master control 36 controls system 10 through VME bus 18. Funnel circuit 16 takes data from the VME bus 18, which can be in bytes, short words (two parallel bytes), or long words (4 parallel bytes), and passes it to the disk drive 12, which accepts only bytes. In addition, circuit 16 stores data on the disk drive 12 in sequential order, starting with the most significant byte of the data transfer to the least significant byte, regardless of the width of each transfer, or of interleaving of different widths. The operation of the circuit is as follows.

Master control 36 programs disk drive 12 and DMA controller 34 for a data transfer from VME bus 18 to disk drive 12 and starts state machine 32. DMA controller 34 performs a VME bus 18 read operation and latches the data into data register 30. Then, DMA controller 34 sends "Data available" to state machine 32.

The state machine 32 clocks the data into the funnel registers 22, 24, 26, 28, reads the transfer type indicated by the DMA controller 34 and returns "Acknowledge" to the DMA controller 34. The "Transfer Type" indicates one of four possible conditions: Long Word (4 parallel bytes), Short Word (2 parallel bytes), Even Byte, or Odd Byte. If the FIFO memory 20 is not full, the state machine 32 writes to the FIFO memory 20 the number of bytes corresponding to the transfer type. If a "Fifo Full" flag is encountered the state machine 32 waits until the disk write operation unloads data from the FIFO memory 20, causing the "Fifo Full" flag to be negated. The state machine 32 transfers the data from the funnel registers 22, 24, 26, 28 to the FIFO memory 20 before responding to the next DMA controller 34 data available. By latching the data and sending an "Acknowledge" to the DMA controller 34 prior to actually performing the FIFO 20 write, the circuit 16 provides a higher burst and sustained data rate by allowing the VME bus read operation and the FIFO write operation to occur in parallel.

Subsequent data transfers occur using the DMA controller 34 "Data Request" and "Transfer Type" signals, and the state machine 32 "Acknowledge" signal until the DMA has completed its programming.

Because the state machine 32 completely unloads the funnel registers 22, 24, 26, 28 into the FIFO memory 20 before it latches the data from the next cycle, the proper data sequence is maintained regardless of the mix of transfer types. This data sequence refers to sending the most significant byte of the transfer to the FIFO memory 20 first followed by next most significant byte, and so on to the least significant byte. For a Long Word, four byte transfer, the funnel register 22 (connected to output D31-D24) sends the most significant data byte to the FIFO memory 20 first by asserting the ~OE1 signal and clocking the FIFO memory 20. Then the funnel register 24 (connected to output D23-D16) sends the next most significant data byte to the FIFO memory 20, followed by the data byte stored in funnel register 20 (connected to output D15-D8), and lastly followed by the least significant data byte stored in funnel register 28 (connected to output D7-D0). A Short Word, two byte transfer writes the data byte stored in funnel register 26 (connected to output D15-D8) to the FIFO memory 20 first, followed by the data byte stored in funnel register 28 (connected to output D7-D0). An Even Byte transfer writes the data byte stored in funnel register 26 (connected to output D15-D8) to the FIFO 20. An Odd Byte transfer writes the data byte stored in funnel register 28 (connected to output D7-D0) to the FIFO memory 20.

FIFO memory 20 latches the data and sends an "acknowledge" to DMA controller 34 prior to actually performing the write to FIFO memory 20. This results in a higher burst and sustained data rate by allowing the VME bus 18 read operation and the FIFO memory 20 write operation to occur in parallel.

As an example, the funnel register 22, 24, 26, 18 are 74ALS374 or equivalent 8-bit registers. The state machine 32 is implemented using an ALTERA 5032 or equivalent programmable logic device. The FIFO is an IDT7204 9 bit FIFO (only 8-bits are used) providing a "Fifo Full" external status signal.

Industrial Application

The present invention finds application in a digital data system in which digital data is transferred over a 4 byte wide bus (such as a VME bus) to a byte wide device, such as a SCSI disk drive. The invention has particular application to a laser printer which prints images on film derived from medical diagnostic imaging modalities such at CT & MRI scanners.

The invention has been described in detail with reference to the figures, however, it will be appreciated that variations and modifications are possible within the spirit and scope of the invention.

What is claimed is:
1. Digital data apparatus comprising:
a first byte-wide digital data bus;
a second four byte-wide digital data bus;
a byte-wide first-in, first-out (FIFO) memory connected to said first byte-wide digital data bus for storing sequential bytes of data from said first byte-wide digital data bus;
first, second, third, and fourth byte-wide funnel registers which are connected in parallel and have inputs connected to said four byte-wide FIFO memory and also having respective outputs;
a four byte-wide data register having first, second, third and fourth byte-wide inputs respectively connected to the outputs of said first, second, third and fourth byte-wide funnel registers and having a four byte-wide output connected to said second four byte-wide digital data bus; and
control means for controlling said digital data apparatus wherein one to four bytes of digital data are transferred from said second four byte-wide digital data bus to said four byte-wide data register in parallel with the transfer of bytes of digital data stored in said FIFO memory to said first byte-wide digital data bus.
wherein said control means selectively controls the transfer of digital data from said second four byte-wide digital data bus to said first byte-wide digital data bus by way of said four byte-wide data register, said first, second, third and fourth funnel registers, and said FIFO memory;
wherein said transferred digital data can be a long word of four bytes, a short word of two bytes, and an odd or even data byte; and wherein said control means controls (a) in a long word mode in which four bytes of a long word are transferred in parallel from said second four byte-wide digital data bus to said four byte-wide data register, are transferred in parallel from said four byte-wide data register to said first, second, third and fourth funnel registers, are transferred sequentially from said funnel registers to said FIFO memory and are transferred sequentially from said FIFO memory to said first byte-wide digital data bus; (b) in a short word mode, in which two bytes of a short word are transferred in parallel from said second four byte-wide digital data bus to said four byte-wide data register, are transferred in parallel from said four byte-wide data register to said first and second funnel registers, are transferred sequentially from said first and second funnel registers to said FIFO memory, and are transferred sequentially from said FIFO memory to said first byte-wide digital data bus; (c) in an odd or even data byte mode, in which a data byte is transferred from said second four byte-wide digital data bus to said four byte-wide data register; is transferred to said second funnel register, if an even data byte is to be transferred or is transferred to said first funnel register if an odd data byte is to be transferred; is transferred to said FIFO register from said second funnel register or from said first funnel register, respectively, and from said FIFO memory to said first byte-wide digital data bus.

2. The apparatus of claim 1 wherein said first byte-wide digital data bus is a SCSI bus and said second four byte-wide digital data bus is a VME bus, and including a SCSI disk drive connected to said first byte-wide digital data bus.

3. The apparatus of claim 1 wherein said control means includes a funnel controller state machine and a DMA controller for transferring data in parallel from said FIFO memory to said first byte-wide digital data bus and from said second four byte-wide digital data bus to said four byte-wide data register.

* * * * *